(12) United States Patent
Scheffler et al.

(10) Patent No.: US 7,914,405 B1
(45) Date of Patent: Mar. 29, 2011

(54) COLLAPSIBLE PET TOY HAVING TIMED POP BACK ACTION

(76) Inventors: Keith Scheffler, Fenton, MO (US);
Simeon E. Tiefel, Stevensville, MT (US)

( * ) Notice: Subject to any disclaimer, the term of this patent is extended or adjusted under 35 U.S.C. 154(b) by 62 days.

(21) Appl. No.: 12/410,339

(22) Filed: Mar. 24, 2009

(51) Int. Cl.
*A63H 27/00* (2006.01)

(52) U.S. Cl. ......... 473/572; 473/577; 446/487; 119/707

(58) Field of Classification Search .................. 473/572, 473/593, 577, 594; 446/486, 487, 46; 119/709
See application file for complete search history.

(56) References Cited

U.S. PATENT DOCUMENTS

| | | | | |
|---|---|---|---|---|
| 2,952,460 A | * | 9/1960 | Ellis | 446/486 |
| 3,218,071 A | * | 11/1965 | Richard | 473/594 |
| 4,794,024 A | * | 12/1988 | Crowell et al. | 446/488 |
| 4,955,841 A | * | 9/1990 | Pastrano | 446/46 |
| 5,797,815 A | * | 8/1998 | Goldman et al. | 473/572 |
| D434,457 S | * | 11/2000 | Goldman et al. | D21/440 |
| D441,407 S | * | 5/2001 | Goldman | D21/440 |
| 6,237,773 B1 | * | 5/2001 | Goldman | 446/46 |
| 6,805,077 B2 | * | 10/2004 | Goldman | 119/707 |
| 6,863,588 B1 | * | 3/2005 | Chu | 473/572 |
| 6,896,577 B1 | * | 5/2005 | Feng | 473/572 |

* cited by examiner

*Primary Examiner* — Steven Wong
(74) *Attorney, Agent, or Firm* — LaMorte & Associates

(57) ABSTRACT

The toy assembly is a ball or similar object that can be temporarily compressed into a disc-shaped object. A short time after compression, the toy pops back into its original ball-like shape. The toy assembly has a body that can be selectively configured between an expanded shape and a compressed shape. The body is naturally biased into its expanded shape. A binding hole is defined on a first side of the body. A nub extends inwardly from the body opposite the binding hole. The nub passes into the binding hole with a friction fit when the body is in its compressed shape. The friction fit creates a friction force that temporarily counteracts the natural bias of the body. After a predetermined period of time, the friction fit fails and the body of the toy pops back into its original shape.

14 Claims, 4 Drawing Sheets

COLLAPSIBLE PET TOY HAVING TIMED POP BACK ACTION

BACKGROUND OF THE INVENTION

1. Field of the Invention

In general, the present invention relates to toy objects that are spring biased into an expanded configuration, yet can be temporarily configured into a collapsed configuration. More particularly, the present invention relates to toy objects, such as balls, that can be temporarily pressed into a collapsed configuration, wherein the toy pops back into an expanded configuration a short time later. The present invention also relates to the method of manufacturing such toy objects.

2. Description of the Prior Art

The prior art is replete with various types of toys that are intended to be thrown to a dog in a game of fetch. Prominent among such toys are balls and discs. It, therefore, is not surprising that pet owners often buy convertible throwing toys for their pets.

Collapsible throwing toys are balls, or similar spherically shaped objects, that are comprised of an upper hemisphere and a lower hemisphere. The upper hemisphere and the lower hemisphere are joined together with hinged connections along a common equatorial joint. Due to the hinged connections between the upper hemisphere and the lower hemisphere, the upper and lower hemispheres of the ball can be collapsed flat against each other. When the upper and the lower hemispheres of the toy are collapsed against each other, the toy has the general configuration of a disc. Accordingly, the collapsible toy can be configured either as a ball or as a disc, depending upon whether or not the toy is compressed.

As the upper and lower hemispheres of the toy are collapsed into a flat configuration, the diameters of the hemispheres expand. To accommodate this expansion, the upper and lower hemispheres of the toy are slotted. When the toy is fully expanded into its ball shape, the slots are closed and the toy has a continuous external surface. Conversely, when the toy is flattened into a disc, the slots open and expand, giving the disc a daisy configuration. A typical daisy configuration of a collapsible throwing toy can be seen by referencing U.S. Pat. No. Des 434,457 to Goldman, entitled Collapsible Toy.

In the prior art, collapsible throwing toys typically have some sort of biasing element that biases the collapsible throwing toy into its expanded, ball-like configuration. For example, in U.S. Pat. No. 5,797,815 to Goldman, entitled Pop-Open Throwing Toy With Controllable Opening Delay And Method Of Operating Same, a collapsible throwing toy is shown that has an internal coil spring. The coil spring biases apart the upper and lower hemispheres of the toy. The collapsible throwing toy can be temporarily configured like a disc by compressing the internal coil spring and resisting the bias of the coil spring with a momentary suction cup connection between the upper and lower hemispheres. As soon as the momentary suction cup connection fails, the internal coil spring pops the collapsible throwing toy back into its expanded ball-like configuration.

Reliance upon a suction cup to trigger the expansion of a collapsed toy has certain inherent problems. Depending upon the game being played with a collapsed toy, the desired period before it pops back into its expanding shape may vary. If a group of people are playing "hot potato" with the toy, a delay of a few minutes may be desirable. If the collapsed toy is being used to play catch with a dog, it is usually desirable for a collapsed ball toy to expand back into its ball shape after being thrown and before it is fetched. This is a window of only a few seconds. Using a standard suction cup triggering mechanism, it is very difficult to get the toy to activate within the desired time window. If a suction cup is wet or is heavily compressed, it may not release until several seconds, or even minutes, have elapsed. If a suction cup is dirty, bent or under compressed, it may release in only one or two seconds.

In pending U.S. patent application Ser. No. 11/801,867, to Goldman, entitled Collapsible Throwing Toy Having Timed Release Mechanism, a collapsible ball is disclosed with a suction cup and a time release control for the suction cup. In this manner, the rate at which the collapsible ball remains collapsed can be selectively controlled with some degree of accuracy.

A problem with all such prior art collapsible toys is that the toys are meant for people and not intended to be used as dog toys. Many prior art collapsible balls contain springs, elastic bands and other small parts that could injure a dog chewing upon the ball. In addition, the panels of many collapsible balls can easily pinch the tongue or jowls of a dog as they spring closed. Furthermore, the release mechanisms of prior art collapsible balls tend to malfunction when used with a dog. Collapsible balls that use suction cup releases malfunction by becoming wet with drool and contaminated with debris. Additionally, if the suction cup is punctured, torn or bent by a dog's teeth, as often happens, then the suction cup ceases to work and the collapsible toy can no longer hold its collapsed form.

A need therefore exists for a means to actively control the release mechanism of a collapsible toy so that the time period for activation can be selected in a reliable and accurate manner. A need also exists for a release mechanism for a collapsible toy that cannot be easily damaged by the teeth of a gnawing dog and does not present a danger to a gnawing dog. These needs are met by the present invention as described and claimed below.

SUMMARY OF THE INVENTION

The present invention is a toy assembly and its method of operation. The toy assembly is a ball or similar object that can be temporarily compressed into a disc-shaped object. A short time after compression, the toy pops back into its original ball-like shape.

The toy assembly has a body that can be selectively configured between an expanded shape and a compressed shape. The body is naturally biased into its expanded shape. A binding hole is defined on a first side of the body. A nub extends inwardly from the body opposite the binding hole. An expansion mechanism is provided for selectively expanding the nub. The nub passes into the binding hole with a friction fit when the body is manipulated into its compressed shape. The friction fit creates a friction force that temporarily counteracts the natural bias of the body. After a predetermined period of time, the friction fit fails and the body of the toy pops back into its original shape. The friction force can be selectively controlled by expanding the nub either before or after it enters the binding hole.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention collapsible pet toy can be made in many shapes, such as a square box shape, an oblong football shape, or even a toy animal shape. However, for the sake of simplicity, in the exemplary embodiment of the present invention, the collapsible throwing toy is configured into the shape of a spherical ball. Such a shape is exemplary and it will be understood that three-dimensional shapes other than spherical balls are intended to be included within the scope of the invention.

Figure 1:
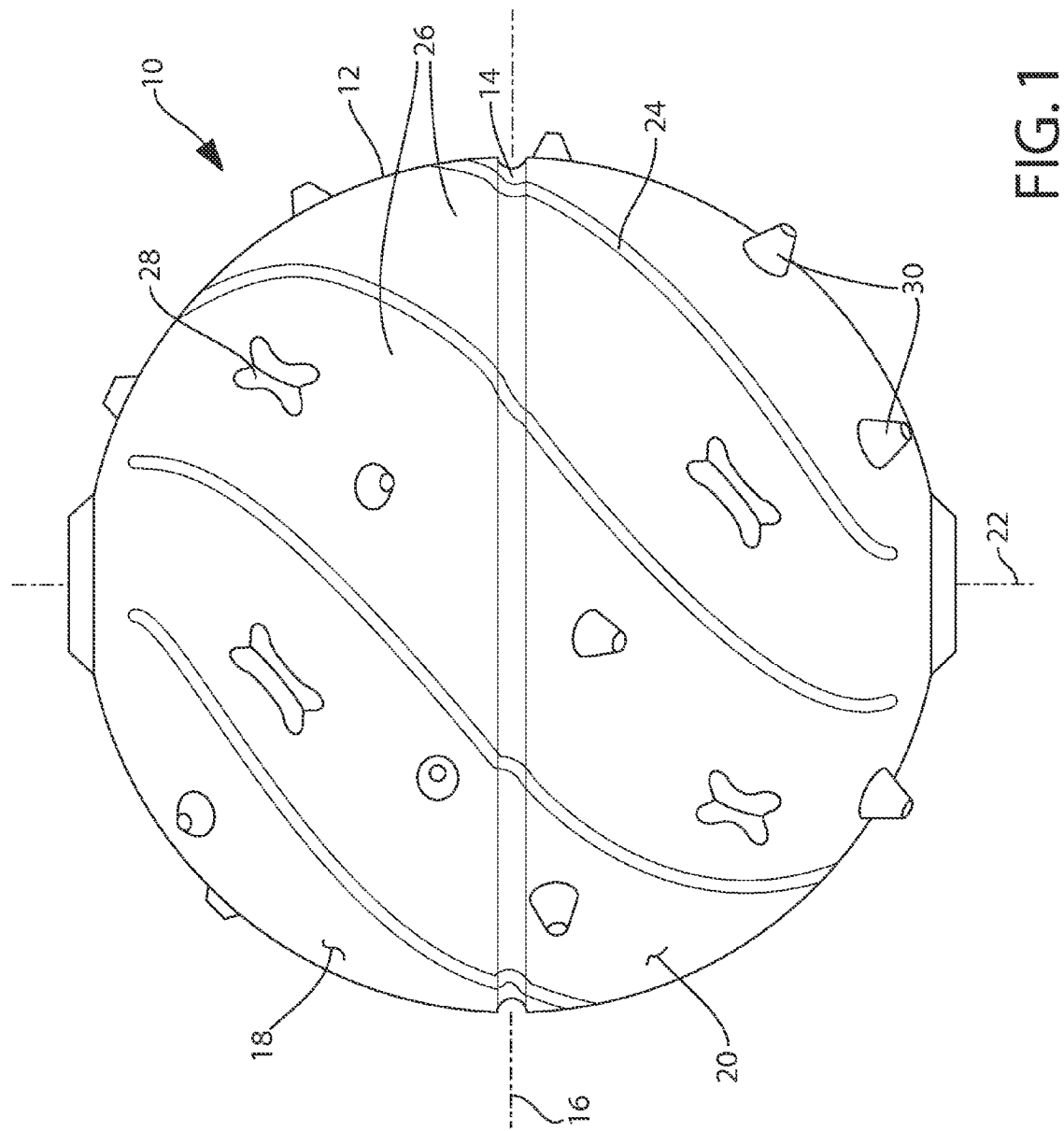
FIG. 1 is a perspective view of an exemplary embodiment of the present invention shown in its expanded condition.
Figure 2:
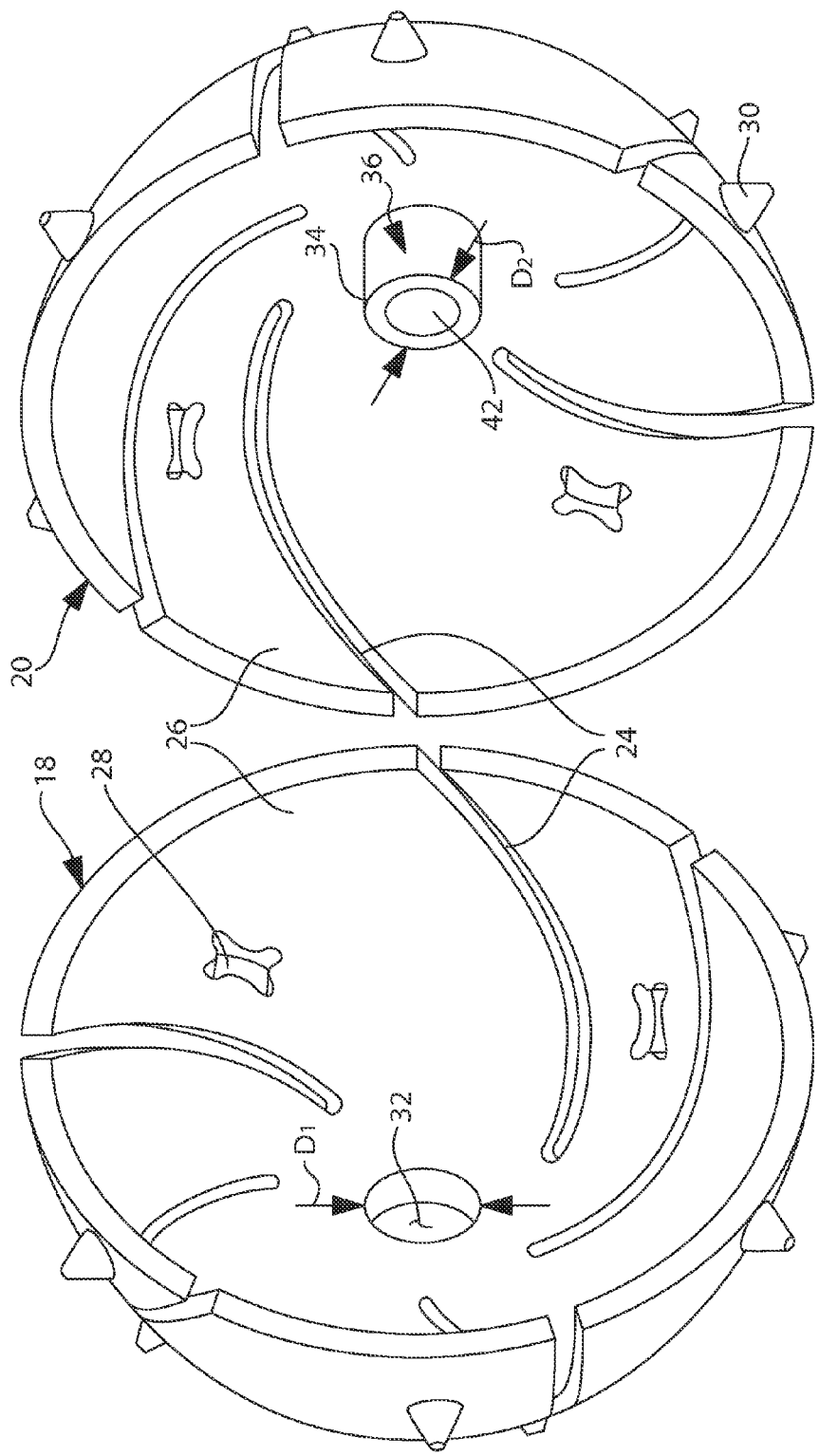
FIG. 2 is a perspective exploded view of the embodiment of FIG. 1.
Figure 3:
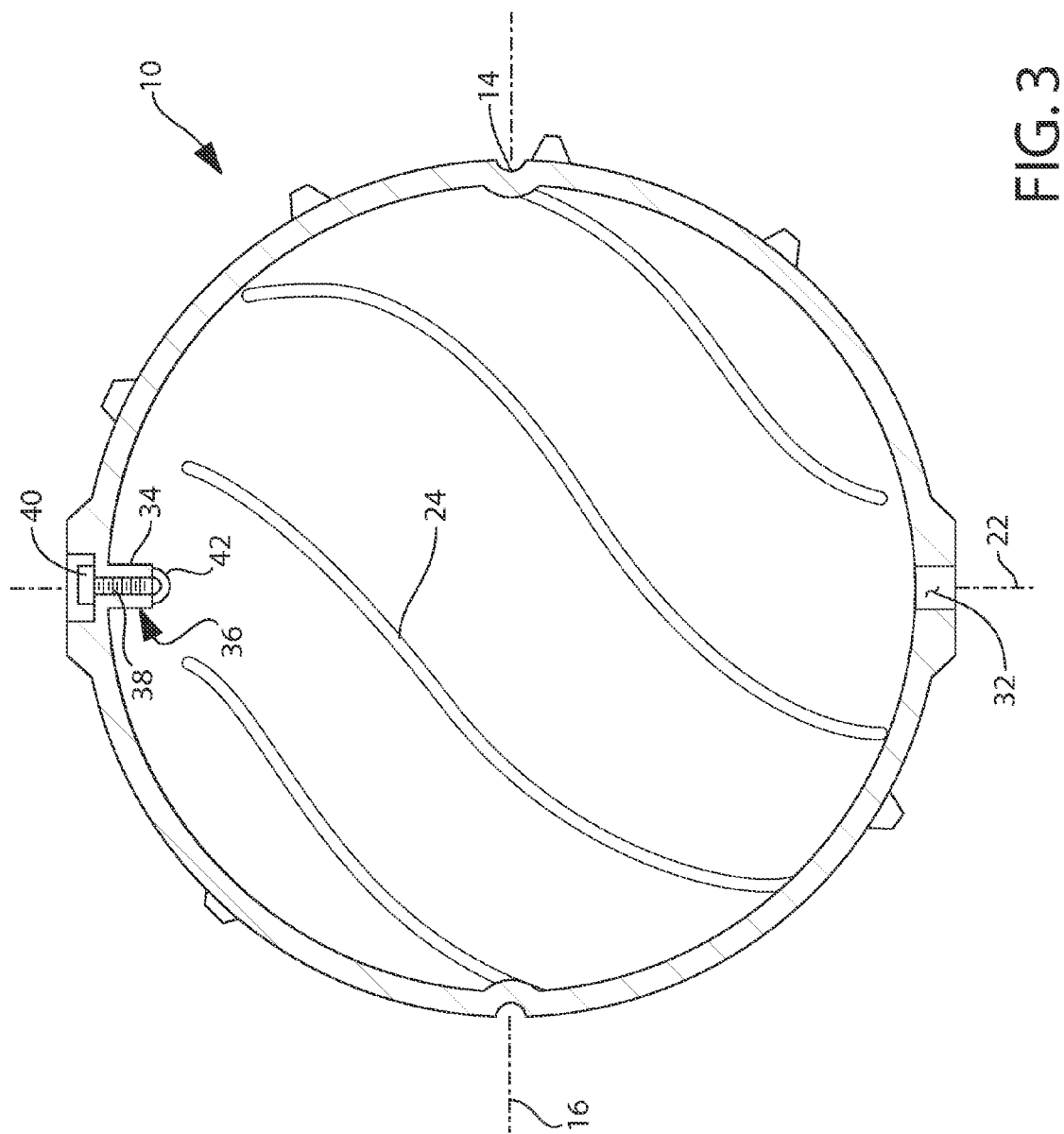
FIG. 3 is a cross-sectional view of the embodiment of FIG. 1.

Referring to FIG. 1, FIG. 2, and FIG. 3 in combination, an exemplary embodiment of a collapsible pet toy 10 is shown. The collapsible pet toy 10 has a spherical body 12 that is molded from an elastic material or soft plastic. A bending joint 14 is disposed around the equator of the spherical body 12. The imaginary equatorial plane 16 extending through all the bending joints 14 separates the spherical body 12 into two opposing hemispherical sections 18, 20. Each of the hemispherical sections 18, 20 has an apex point. Both hemispherical sections 18, 20 are symmetrically disposed around an imaginary central axis 22, which passes through the apex point of each hemispherical section 18, 20. The imaginary central axis 22 is perpendicular to the equatorial plane 16 of the bending joint 14.

A series of curved grooves 24 are formed into each hemispherical section 18, 20. The grooves 24 from each hemispherical section 18, 20 interconnect across the imaginary equatorial plane 16. The grooves 24 define bending segments 26. Each bending segment 26 extends from the first hemispherical section 18 in into the second hemispherical section 20. Furthermore, a bending joint 14 is present in the center of each of the bending segments 26. Although each of the bending segments 26 is separated by the grooves 24, the ends of the bending segments 26 are conjoined near the apex points of the opposing hemispherical sections 18, 20.

In the shown embodiment, the spherical body 12 contains seven grooves 24 that define seven bending segments 26. The grooves 24 are curved to provide a stylish shape to the bending segments 26. Such a configuration is merely exemplary and it should be understood that straight grooves or grooves of many different curvatures can be used. What is important is that the grooves 24 separate the bending segments 26. In this manner, the bending segments 26 are unlikely to pinch a dog, should the collapsible pet toy pop into is ball shape while in the mouth of a dog.

A plurality of decorative openings 28 can be formed through each of the hemispherical sections 18, 20. Likewise, protrusions 30, such as truncated spikes and nubs, can be molded on the exterior of each of the hemispherical sections 18, 20. The protrusions 30 make the collapsible pet toy 10 easier to grasp by a dog. The protrusions 30 also add some randomness to the movement of the collapsible pet toy 10 when it rolls or bounces.

The two hemispherical sections 18, 20 are mirror images of each other except for the structure of the apex points. In the first hemispherical section 18, a binding hole 32 is formed through the apex point. The binding hole 32 can have many peripheral shapes. In the exemplary embodiment, the binding hole 32 is illustrated as being round for the sake of simplicity. The binding hole 32 has an inside diameter D1.

A nub 34 extends inwardly from the apex point of the second hemispherical section 20. The nub 34 has a cross-sectional profile that matches the shape of the binding hole 32 in the opposite hemispherical section 18. Furthermore, the nub 34 is sized to just fit through the binding hole 32. As such, for the exemplary embodiment, the nub 34 is cylindrical in shape, having a diameter D2 that is just slightly smaller than the diameter D1 of the binding hole 32.

A compression lock assembly 36 is provided. The compression lock assembly 36 consists of a threaded shaft 38 with a hand-turned head 40 and a threaded end nut 42 or cap that is engaged by the threaded shaft 38. The compression lock assembly 36 extends into the nub 34. When the threaded shaft 38 is tightened, some of the material of the nub 34 is compressed between the head 40 of the screw and the threaded end nut 42. As the material of the nub 34 is compressed, the nub 34 becomes shorter and thicker. The diameter D2 of the nub 34 can therefore be selectively expanded to a size that is significantly wider than the diameter D1 of the binding hole 32 on the opposite side of the spherical body 12.

Figure 4:
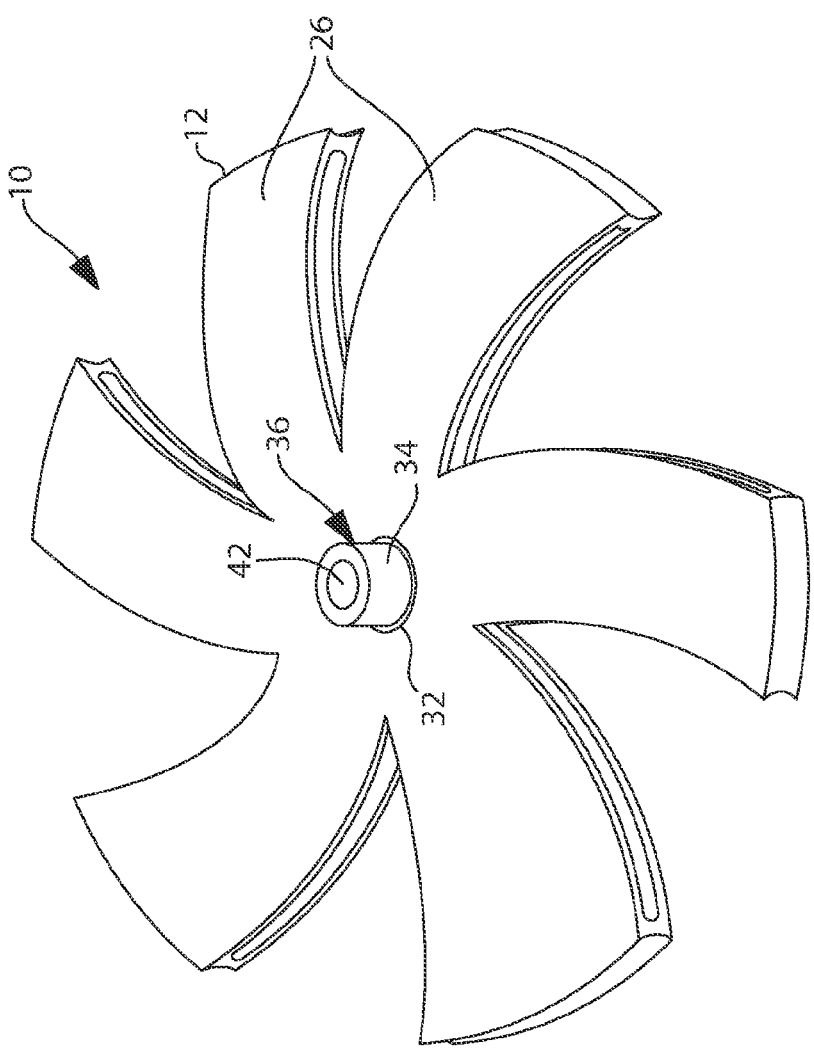
FIG. 4 is a cross-sectional view of the exemplary embodiment in a compressed configuration.

Referring to FIG. 4 in conjunction with FIG. 2, it will be understood that the spherical body 12 of the collapsible pet toy 10 can be altered into a disc shape by pressing the two hemispherical sections 18, 20 of the spherical body 12 together. When pressed together, the spherical body 12 collapses and the nub 34 from one can pass into the binding hole 32 of the other. Prior to collapsing the pet toy 10, the threaded shaft 38 of the compression lock assembly 36 is tightened slightly to compress the nub 34. The nub 34 is slightly compressed and expands to a diameter that is slightly larger than the diameter of the binding hole 32. Consequently, when the nub 34 is manually pressed into the binding hole 32, the nub 34 mechanically engages the binding hole 32 with a friction fit. The friction fit resists the withdrawal of the nub 34 out of the binding hole 32.

When the pet toy 10 is pressed into a collapsed condition, the bending segments 26 bend. Most of the bending occurs along the bending joints 14. However, the bending segments 26 are molded in an unbent shape. Accordingly, the bending segments 26 resist being bent and provide a spring bias in opposition to being bent. The bias of all the bending segments 26 combine to provide significant resistance to any compression.

Each of the bending segments 26 can be individually molded and assembled into the collapsible pet toy 10. However, since the collapsible pet toy 10 is intended for pets, it is preferred that all the bending segments 26 be unistructurally molded as part of a single piece spherical body 12. This eliminates small parts that may dislodge and present a hazard to a gnawing dog.

Once the pet toy 10 is pressed into its compressed condition, the bias of the bending segments 26 tries to return the pet toy 10 back into its expanded condition. This bias works against the friction forces holding the nub 34 in the binding hole 32. After a period of time, the bias of the bending segments 26 overcomes the friction forces and the nub 34 disengages from the binding hole 32. The pet toy 10 then immediately pops back into its original expanded condition.

The resistance provided by the friction forces between the nub 34 and the binding hole 32 depends upon how much larger the nub 34 is than the binding hole 32. If the nub 34 is only slightly larger than the binding hole 32, then small friction forces exist. If the nub 34 is significantly larger than the binding hole 32, then larger friction forces exist. The larger the friction force, the longer it takes the bias of the bending segments 26 to overcome those friction forces. It will therefore be understood that the compression lock assembly 36 can be used as a time release mechanism. The more the threaded shaft 38 is turned, the more the nub 34 compresses. The more the nub 34 compresses, the more friction forces are created with the binding hole 32 and the longer it takes to separate the nub 34 from the binding hole 32.

Both the nub 34 and the binding hole 32 that received the nub 34 are highly resistant to damage from the teeth of a dog. If either element becomes scratched, torn or punctured, the damage would have little effect upon the functionality of the components. If the damage increases frictional forces, the nub 34 can be adjusted thinner to compensate. Likewise, if the damage decreases frictional forces, the nub 34 can be made thicker to compensate.

It will now be understood that when the pet toy 10 is pressed into its collapsed condition, the bendable segments 26 bend until the nub 34 is received within the binding hole 32. The connection between the nub 34 and the binding hole 32 is temporary as the two parts slowly separate under the counteracting force of the bending segments 26. As soon as the nub 34 separates from the binding hole 32, the collapsible pet toy 10 instantly pops back into its original shape. The rate that the nub 34 exits the binding hole 32 is largely determined by the manual setting made on the threaded shaft 38 for compressing and widening the nub 34. Consequently, a person can adjust the release rate to either allow for the quick release or a long delayed release. A person can therefore adjust the collapsible throwing toy 10 so that it remains collapsed for anywhere from a few seconds to a few minutes.

It will be understood that the embodiment of the present invention collapsible pet toy that is described and illustrated is merely exemplary and a person skilled in the art can make many variations to the embodiment shown without departing from the scope of the present invention. All such variations, modifications and alternate embodiments are intended to be included within the scope of the present invention as defined by the appended claims.

What is claimed is:

1. A collapsible toy assembly, comprising:
   a body that can be selectively configured between an expanded shape and a compressed shape, wherein said body is naturally biased into said expanded shape;
   a binding hole defined on a first side of said body;
   a nub extending inwardly from said body opposite said binding hole; and
   an expansion mechanism for selectively expanding said nub, wherein said nub passes into said binding hole with a friction fit when said body is in said compressed shape, therein retaining said body in said compressed shape for a period of time.

2. The assembly according to claim 1, wherein said nub is made of elastic material, said nub having a first end that is coupled to said body and a free second end that passes into said binding hole.

3. The assembly according to claim 2, wherein said expansion mechanism compresses said first end of said nub toward said second end of said nub, therein causing said nub to expand in at least one section between said first end and said second end.

4. The assembly according to claim 3, wherein said expansion mechanism includes a threaded shaft that extends into said nub and a head for manually turning said treaded shaft.

5. The assembly according to claim 1, wherein said body is symmetrically disposed around an imaginary central axis.

6. The assembly according to claim 5, further including a plurality of slots formed in said body, wherein said slots are symmetrically disposed around said imaginary central axis.

7. The assembly according to claim 6, wherein said slots remain open when said body is in said expanded shape.

8. The assembly according to claim 1, wherein said body is spherical in shape.

9. The assembly according to claim 1, wherein said body is molded as a single piece.

10. A collapsible toy assembly, comprising:
    a hollow body having a spherical shape;
    a protrusion extending inwardly from a first point on said body, wherein said protrusion is made of elastic material;
    an expansion mechanism that selectively expands said protrusion;
    a hole formed in said body opposite said protrusion, wherein said hole receives said protrusion with a friction fit when said body is compressed out of said spherical shape and into a compressed shape, wherein said friction fit retains said body in said compressed shape for a predetermined period of time.

11. The assembly according to claim 10, wherein said expansion mechanism includes a threaded shaft that extends into said protrusion.

12. The assembly according to claim 10, further including a plurality of slots formed in said body that expand when said body is moved toward said compressed shape.

13. The assembly according to claim 10, wherein said body is molded as a single piece.

14. In a pop-up toy, a method of selectively controlling movement, comprising the steps of:
    biasing two sections of said pop-up toy apart with a biasing force;
    providing a binding hole in a first of said sections;
    providing a nub in a second of said sections;
    pressing said nub into said binding hole against said biasing force, wherein said nub enters said binding hole with an interference fit that creates a friction force that resists said biasing force for a predetermined period of time; and
    selectively expanding said nub to increase said friction force and said predetermined period of time.

\* \* \* \* \*